March 3, 1964 W. D. MEALS 3,122,878
WIRE ROPE LOOP
Filed Sept. 13, 1962

INVENTOR.
WILLIAM D. MEALS
BY
his ATTORNEYS

3,122,878
WIRE ROPE LOOP
William D. Meals, Williamsport, Pa., assignor to Jones & Laughlin Steel Corporation, Pittsburgh, Pa., a corporation of Pennsylvania
Filed Sept. 13, 1962, Ser. No. 223,401
6 Claims. (Cl. 57—142)

This invention relates to a wire rope loop or eye and method of forming it. It is more particularly concerned with an endless loop.

The end of a wire rope is commonly terminated in a loop or eye which can be slipped over a crane hook or other fastening device. Wire rope slings commonly are provided with a loop at each end. A loop or eye may be provided by bending the end of the rope back around on the rope body and splicing or tucking the individual strand ends into and between the strands of the rope body portion. Alternatively, a loop may be formed by fastening the rope end to the body portion with a separate fitting. The fitting may be a sleeve or collar held together with a nut and bolt or the like, or the fitting may be made of ductile metal which is compressed around the rope body and end. None of these loops or eyes is entirely satisfactory. The tucked or spliced loop is a potential source of weakness if the tucks are not properly made, or work out of place. A loop secured with a fitting, either clamped or mechanically compressed, has disadvantages for use with a sling or the like. The fitting necessarily is substantially greater in diameter than the rope, and tends to catch on projections when the sling is passed around an object to be lifted. Furthermore, the fitting necessarily reduces the flexibility of the rope or sling in the region where it is applied.

It is an object of my invention, therefore, to provide a method of forming a wire rope loop without splicing or clamping the rope. It is another object of my invention to provide an endless wire rope loop or eye. It is another object to provide such a loop with an exterior free from projecting rope ends or fittings. It is still another object to provide a wire rope loop having approximately the same strength as the rope itself. Other objects of my invention will appear in the course of the following description thereof.

Figure 1:
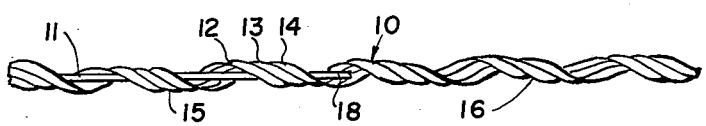
Figure 2:
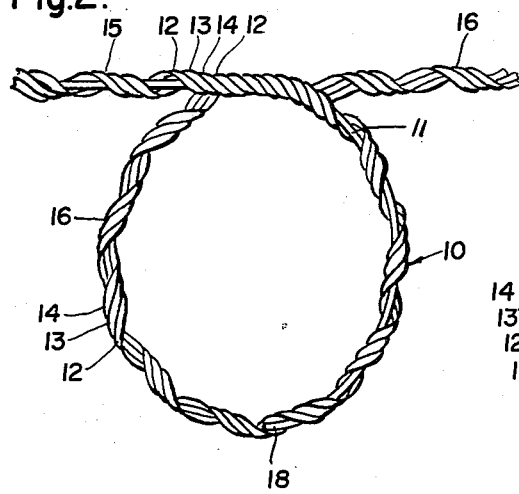
Figure 3:
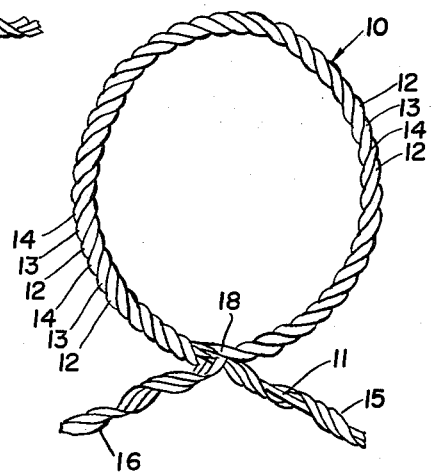
Figure 4:
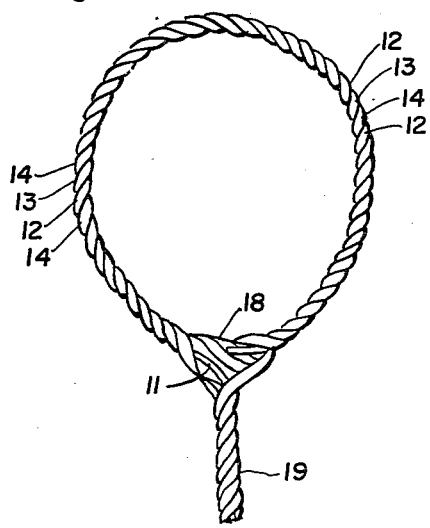

An embodiment of my invention presently preferred by me is illustrated in the attached figures to which reference is now made. FIGURE 1 is a length of wire rope prepared for forming into a loop of my invention. FIGURE 2 is the first ring of a loop of my invention formed from the rope of FIGURE 1. FIGURE 3 is a completed loop of my invention, but with separated rope ends. FIGURE 4 is a complete loop of my invention with rope ends combined into a single attached rope. I describe hereinafter the method of forming a loop of my invention from wire rope having a non-metallic core around which is laid six strands. Wire rope of other configurations having an even number of outside strands may, however, be used for my invention.

I form my loop from a desired length of rope 10 having a core portion 11 around which are laid contiguous strands 12, 13 and 14. Core 11 extends through end 15 of rope 10 and terminates at the center 18 of rope 10. The remaining end 16 of rope 10 has no core. Strand 14 is not contiguous to the next spiral of strand 12, but is separated therefrom by a space equivalent to that occupied by contiguous strands 12, 13 and 14. Rope 10 is most easily prepared by unlaying three contiguous strands from a piece of conventional six strand rope, and removing half the rope core.

The center 18 of rope 10 determines the position of the throat of the complete loop to be formed. Ends 15 and 16 are bent around to form a single ring of the desired size and are crossed at the throat of the ring as is shown in FIGURE 2. The throat of this single ring is opposite the throat of the completed loop. Core 11 is found in one half only of the single ring of FIGURE 2.

End 15 is then bent around the adjoining half of the single ring previously formed and is twisted around that half so that groups of contiguous strands 12, 13 and 14 fall in the spaces left by the three contiguous strands which were removed from rope 10. The core 11 is supplied by end 15 so that the result is half a double ring of contiguous strands 12, 13, and 14 twisted around core 11 with strand 14 abutting the next spiral of strand 12. End 16 is bent around the other half of the single ring previously formed and twisted around that half in the same way except that the core 11 is supplied by the half single ring. The ends 15 and 16 are crossed below the throat of the double ring loop as appears in FIGURE 3.

Ends 15 and 16 below the throat of the double ring loop are twisted together to form a solid rope 19, end 15 supplying the core 11. The complete double ring loop with attached rope is shown in FIGURE 4. The group of strands at the middle 18 of rope 10 is seen to comprise half the total number of strands in the double ring loop in FIGURES 3 and 4, and is continuous across the throat of that loop. The strands in each end 15 and 16 which are twisted together to form rope 19 comprise, in each case, half the strands forming the corresponding half of the double ring loop of FIGURES 3 and 4.

Both ends of rope 10 come together at the free end of rope portion 19 of my complete loop so that the loop is formed without the necessity of splicings or clamps of any sort. If a sling or other rope length with a loop at each end is required, it may be made up of a loop of my invention at one end and a conventional hand spliced or mechanically connected loop at the other end. A sling can also be made of two loops of my invention, the rope portions of which are spliced together in any conventional way.

I claim:
1. A wire rope sling eye comprising a loop formed of a plurality of unspliced contiguous strands twisted helically together, half of those strands being continuous across the throat of the loop from one side thereof to the other and the other half of those strands from each side of the loop being twisted together below the throat.

2. A wire rope sling eye comprising a loop formed of a core and a plurality of unspliced contiguous strands twisted helically together around the core, half of those strands being continuous across the throat of the loop and the other half of those strands from each side of the loop being twisted together around the core below the throat to form a rope consisting of the core and the strands from each side of the loop.

3. A wire rope sling eye comprising a single group of contiguous strands twisted helically together to leave gaps between successive twists of the contiguous strands, those strands being bent into a composite loop of two rings, the throat of which is at the mid point of those strands, the second ring of which is twisted together with the first ring so that the contiguous strands of the first ring fall in the gaps between the contiguous strands of the second ring, the ends of the strands below the throat of the loop being twisted together so that the contiguous strands of one end fall in the gaps between the contiguous strands of the other end.

4. A wire loop sling eye comprising a plurality of contiguous strands twisted helically together to leave gaps between successive twists of the contiguous strands and a core extending from the mid point of those strands to one end thereof, the strands of the core-containing end being twisted around that core, the strands being bent into a composite loop of two rings having its throat at the mid point of the strands, the second ring of the loop being twisted together with the first ring so that the contiguous strands of the first ring fall in the gaps between the contiguous strands of the second ring and the strands of both rings are twisted around the core, the ends of the strands below the throat of the loop being twisted together and around the core so that the contiguous strands of one end fall in the gaps between the contiguous strands of the other end.

5. The method of making a wire rope sling eye comprising forming a rope of a plurality of continguous strands twisted helically together to leave gaps between successive twists of the contiguous strands, bending that rope to form a loop at the center thereof and a pair of over-lapping ends, twisting each of those ends around an opposite side of the loop to the throat thereof so that the contiguous strands of the ends fall in the gaps between the contiguous strands of the loop, and twisting together the ends of the loop below the throat so that the contiguous strands of one end fall in the gaps between the contigous strands of the other end.

6. The method of making a wire rope sling eye comprising forming a rope of a plurality of contiguous strands twisted helically together to leave gaps between successive twists of the contiguous strands, the rope containing a core extending from its center to one end thereof, the strands of the core-containing end being twisted around the core, bending the rope to form a loop at the center thereof and a pair of overlapping ends, the core extending half-way around the loop, twisting the core-containing end around the coreless half-loop and the coreless end around the core-containing half-loop to the throat thereof so that the contiguous strands of each end fall in the gaps between the contiguous strands of the loop, and twisting together the core containing end and the coreless end of the rope below the throat so that the contiguous strands of one end fall in the gaps between the contiguous strands of the other end.

References Cited in the file of this patent

UNITED STATES PATENTS

| | | |
|---|---|---|
| 1,334,244 | Howe | Mar. 16, 1920 |
| 2,454,592 | Budzinski | Nov. 23, 1948 |
| 2,463,199 | Peterson | Mar. 1, 1949 |
| 2,967,391 | Hemick et al. | Jan. 10, 1961 |
| 3,088,287 | Crandall | Nov. 14, 1961 |